United States Patent [19]
Guntert

[11] 3,766,671
[45] Oct. 23, 1973

[54] METHOD AND APPARATUS FOR EXCAVATING WITH AN ENDLESS BUCKET LINE

[76] Inventor: Ronald M. Guntert, 2402 Clarendon St., Stockton, Calif. 95204

[22] Filed: Dec. 20, 1971

[21] Appl. No.: 209,584

[52] U.S. Cl. .................. 37/69, 37/195, 198/116
[51] Int. Cl. .................................... E02f 3/14
[58] Field of Search ..................... 37/69, 60, 72; 198/116, 12; 214/15; 114/.5

[56] References Cited
UNITED STATES PATENTS

| | | | |
|---|---|---|---|
| 3,378,130 | 4/1968 | Wallace | 37/69 X |
| 708,583 | 9/1902 | Powell | 37/70 |
| 3,146,537 | 9/1964 | Von Bolhar | 37/69 |
| 3,672,079 | 6/1972 | Masuda et al | 37/69 |
| 3,437,064 | 4/1969 | Hunsucker | 114/.5 D |
| 2,636,288 | 4/1953 | Thomas | 37/69 X |
| 530,675 | 12/1894 | Ball | 37/69 |

FOREIGN PATENTS OR APPLICATIONS

| | | | |
|---|---|---|---|
| 267,775 | 3/1927 | Great Britain | 37/69 |
| 1,229,017 | 11/1966 | Germany | 37/72 |
| 14,435 | 7/1891 | Great Britain | 37/69 |
| 1,148,751 | 4/1969 | Great Britain | 37/72 |

Primary Examiner—Robert E. Pulfrey
Assistant Examiner—Clifford D. Crowder
Attorney—Mark Mohler et al.

[57] ABSTRACT

For underwater excavating I employ a hull having a well. The hull supports a pair of catenary terminals relatively movable toward and away from each other. The terminals may be in the form of rotary drums. Both drums are mounted on the hull for yielding movement such as pivoting about a fore and aft horizontal axis. A continuous flexible line is supported from the hull by being trained around the drums and extends in a catenary curve below the hull to a variable depth controlled by varying the length of the line along the catenary. The line is advanced in a predetermined direction by a driver operating one or more of the drums. Supplemental suspension lines fasten excavating buckets to the continuous line for limited movement. The buckets discharge into material handling equipment on the hull. Preferably, the line shape or catenary curve below the hull is variable by another catenary terminal in the form of another rotary drum, idle or driven, suspended from the hull and movable fore and aft thereon, usually in company with one of the hull mounted drums. The other or additional rotary drum also can swing laterally and fore and aft and can be raised and lowered; i.e., projected and retracted, affording universal yielding movement. If desired the line can be doubled to include two lines in spaced parallel planes and of similar curvature, the buckets being flexibly fastened to both lines, if desired. Also, the line or lines can carry floats.

22 Claims, 20 Drawing Figures

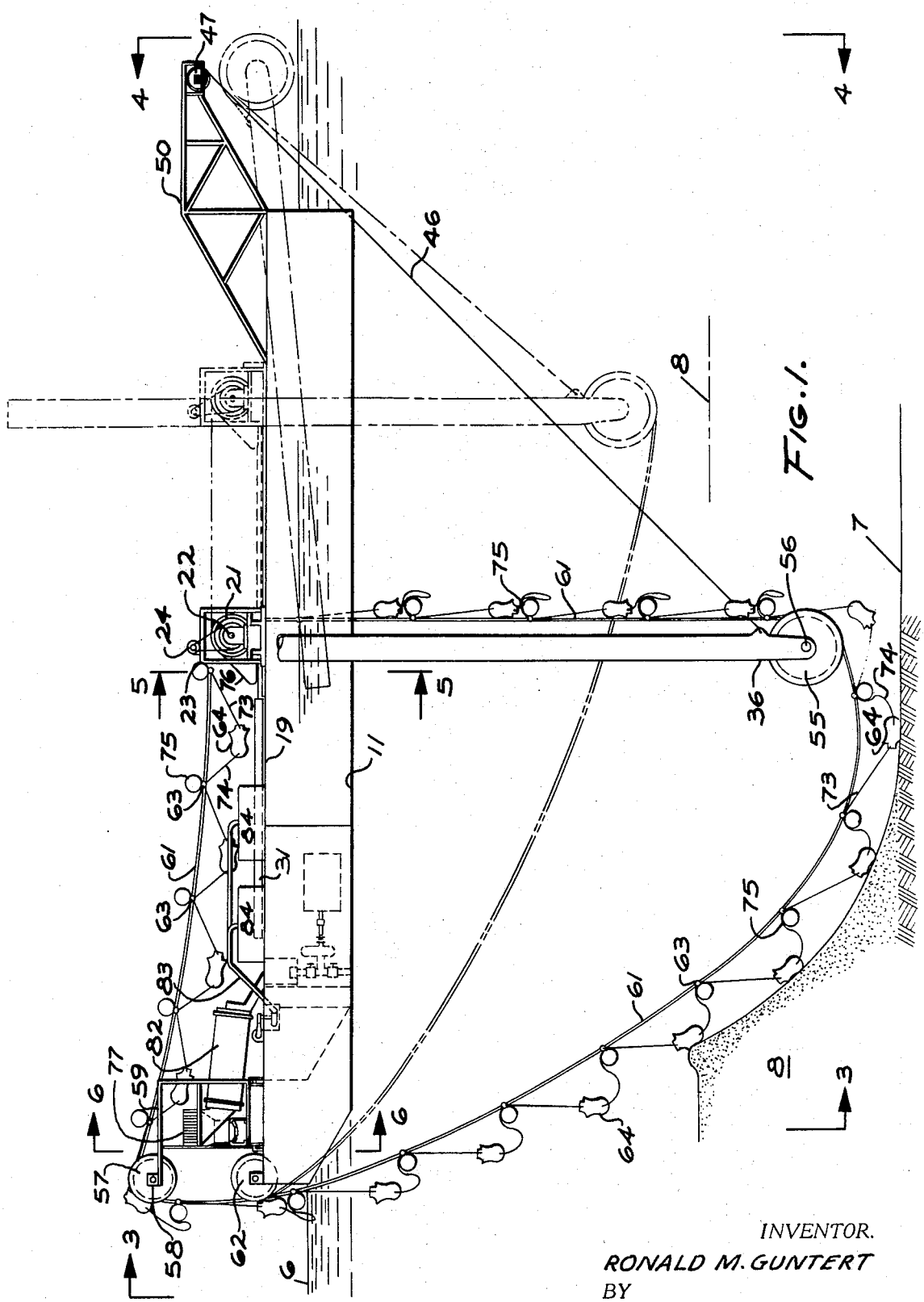

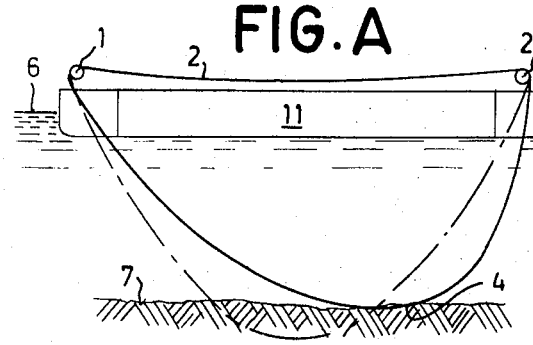
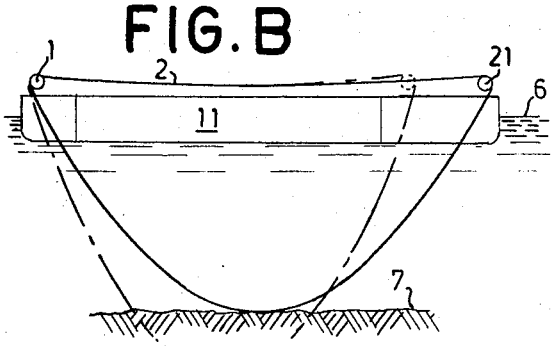
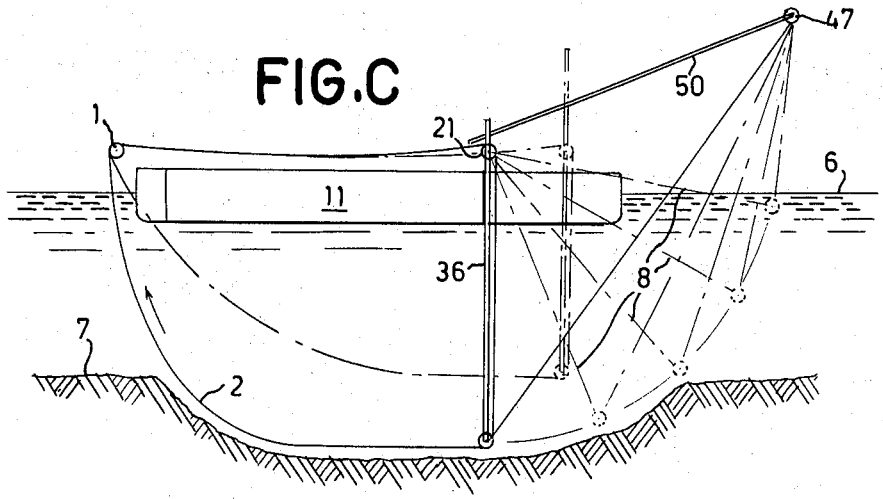
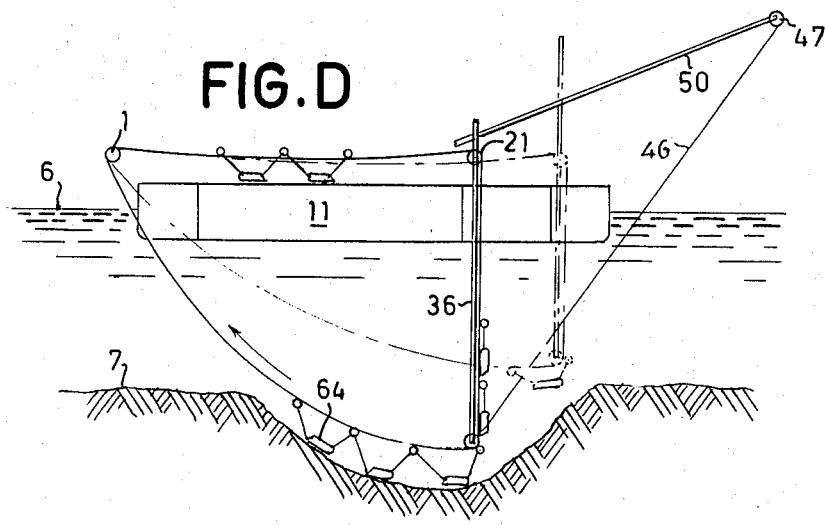

INVENTOR.
RONALD M. GUNTERT
BY
Boyken, Mohler, Foster o Schwab
ATTORNEYS

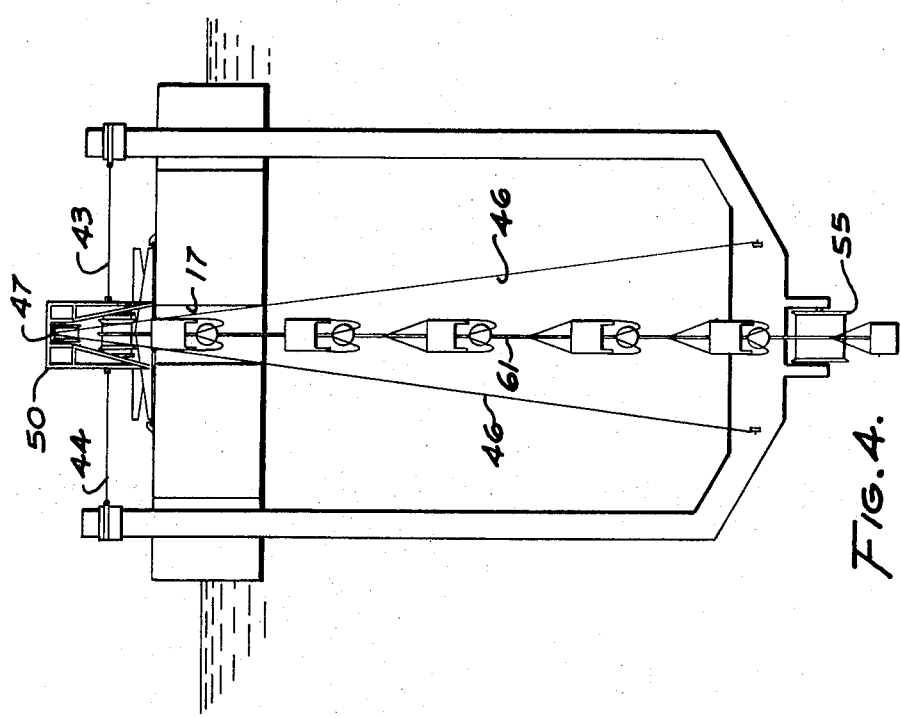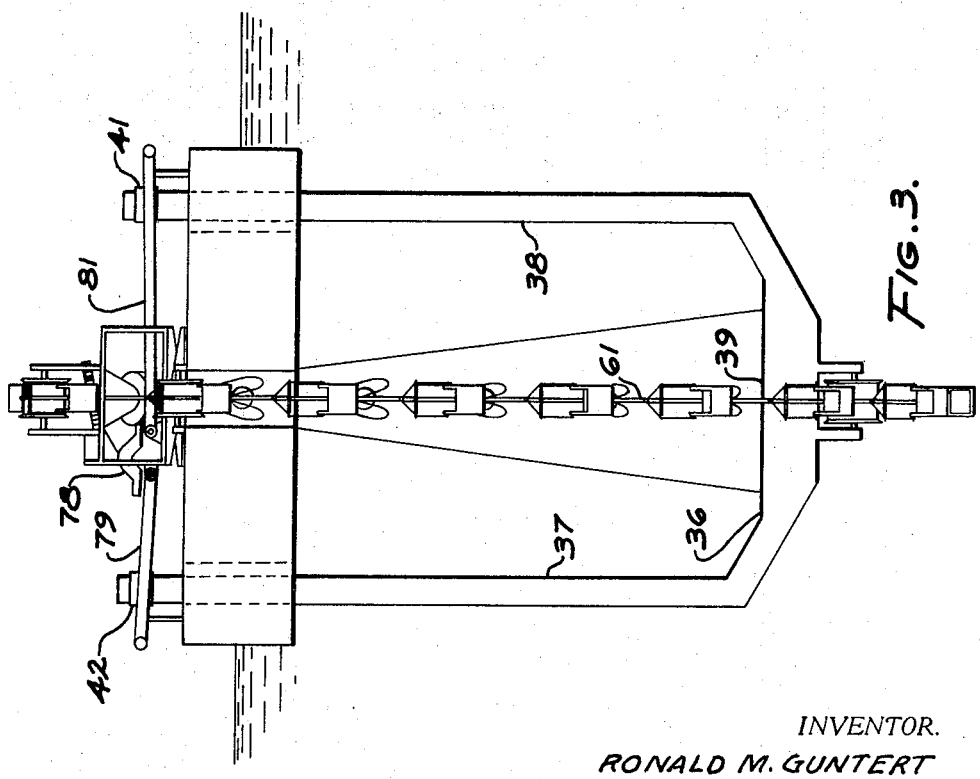

INVENTOR.
RONALD M. GUNTERT
BY
Boyken, Mohler, Foster & Schwab
ATTORNEYS

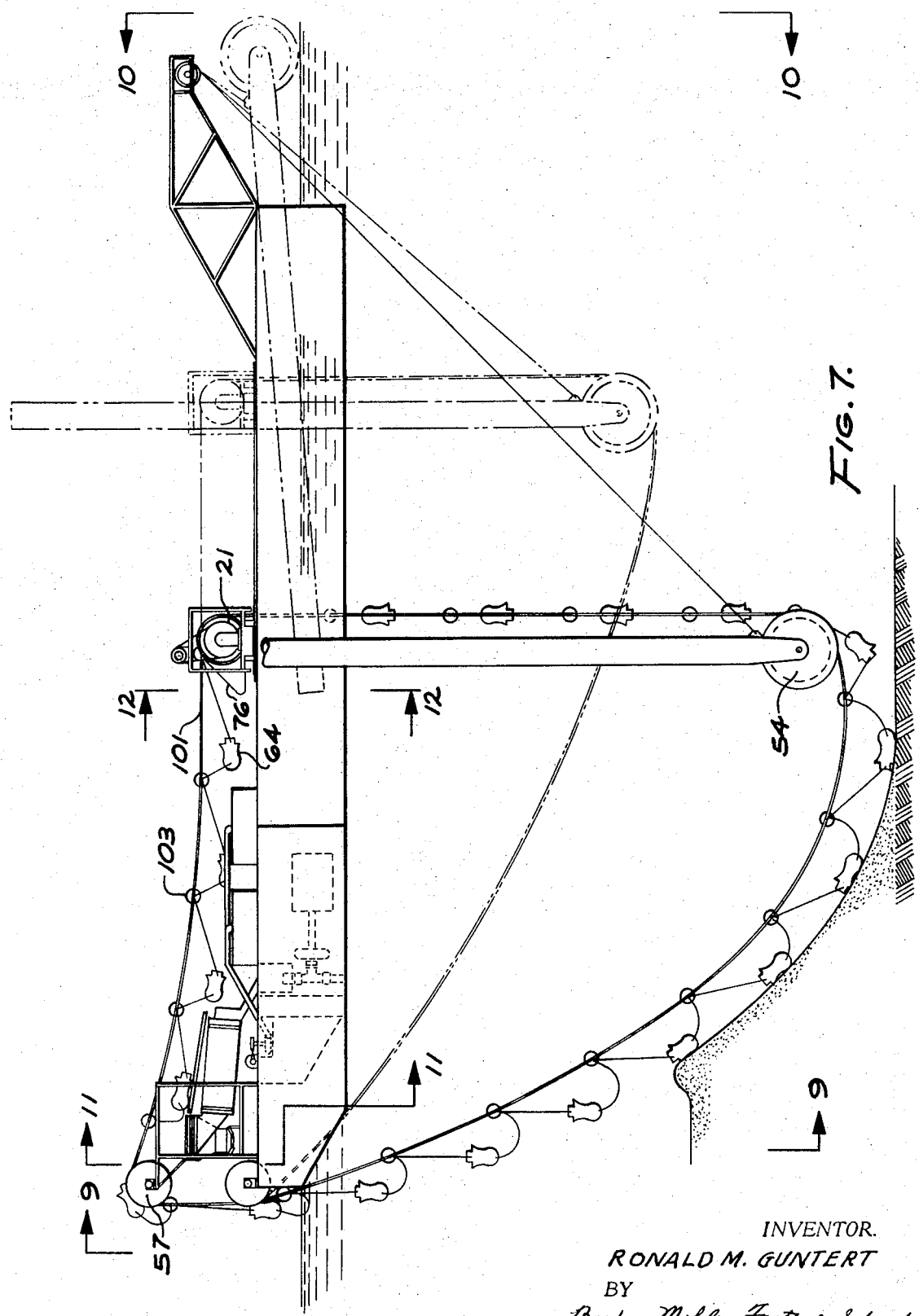

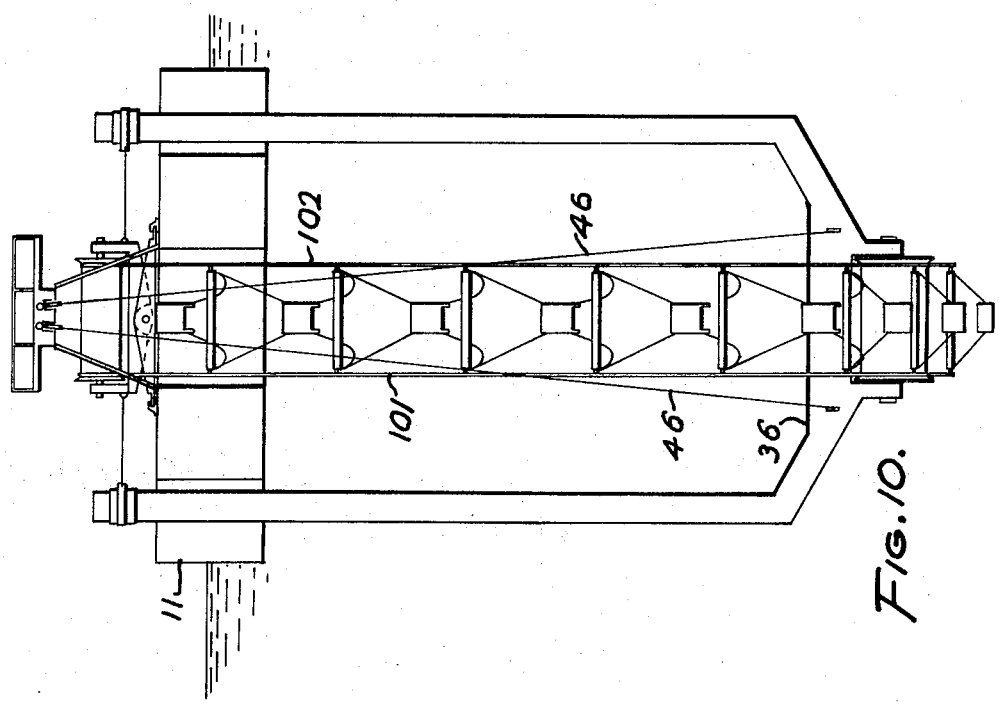
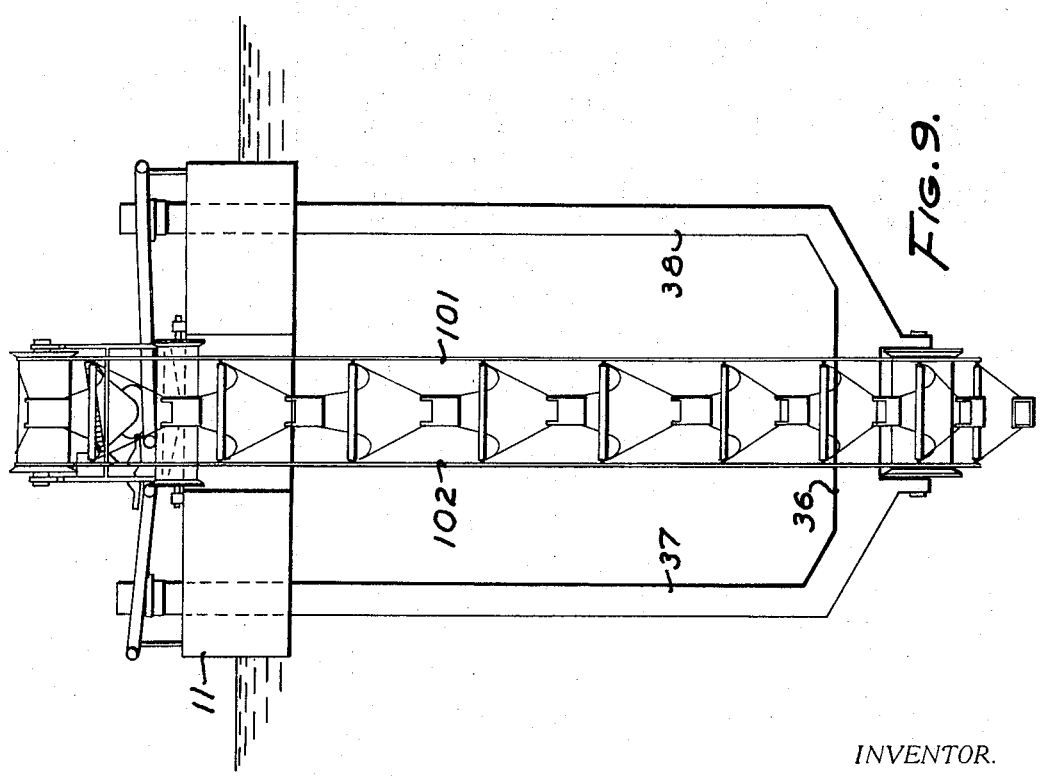

INVENTOR.
RONALD M. GUNTERT

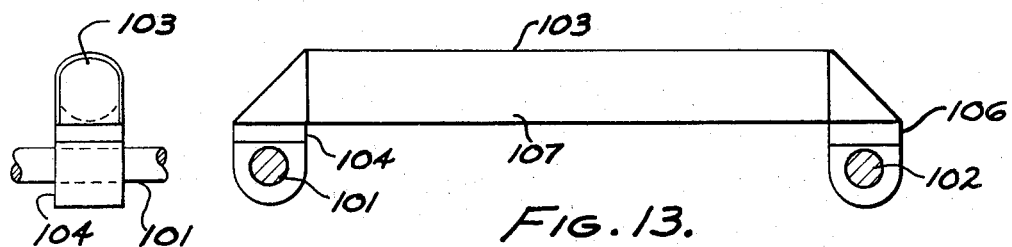
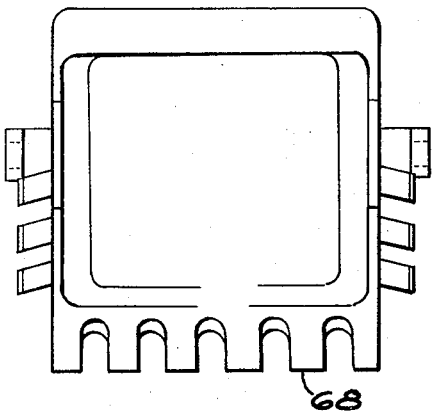
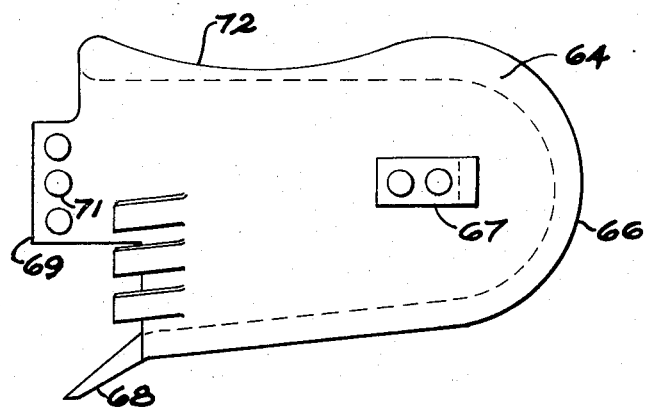
INVENTOR.
RONALD M. GUNTERT

METHOD AND APPARATUS FOR EXCAVATING WITH AN ENDLESS BUCKET LINE

To recover material situated beneath any kind of a water body, particularly material at several hundred feet below the surface, and to do so satisfactorily, without equipment damage and economically over a long period, is difficult or often impossible without special facilities and methods. Although there are many and varied recovery problems in various environments, particular attention at present is being given to the problem of excavating bottom material beneath the ocean either for its own sake or for values it contains, or both. For use in that circumstance and also in other environments, I have conceived of an excavating machine and manner of excavating having certain fundamental characteristics that can be varied to suit a wide range of operating conditions.

While only two of the numerous different possible forms or particular embodiments of the fundamental invention are disclosed in detail hereinafter, my underwater excavator concept can be considered generally as including a support; for example, an elongated hull designed for sufficient buoyancy on a water body, such as but not necessarily the ocean.

Suspended from the hull by suitable suspending means is a flexible, endless or looped line. Under the influence of gravity such a line, when supported at two separate points, hangs in a vertical plane and partakes of the shape of a catenary curve. This is true of the line between or away from points of support. At such support points or contact surfaces the line, in practice, touches the point or conforms to the surface, in the latter instance usually departing from a catenary curvature. Such point or contact with a differently curved support surface and in fact any point or surface that causes the line to depart from a catenary curve I call a "terminal point" or "line guide" whether it is a stationary or movable mathematical point or the effective portion of a line contacting surface.

In a practical instance, on the water support or hull I provide a pair of terminal points in the form of rotary line guiding or engaging members such as sheaves, wheels, drums or the like. These are mounted on the hull for rotation about turning axes normal to the plane of the line and are themselves largely situated in such plane. At least one of these rotary members is propelled or rotated by suitable machinery and is referred to as a driving drum since it advances the line in a predetermined direction, usually a horizontal direction parallel to the length of the hull and conveniently along the center line thereof. The other rotary member may also be driven but usually is not driven so is referred to as a dry or hull idler drum.

I vary the shape of the catenary curve of the line by moving the drums relative to each other, usually by relative movement in the predetermined direction. While both drums can be moved relative to the hull, it is, in practice, usually desirable to move only one drum relative to the hull. For example, the driving drum is movable longitudinally of the hull. Since the range or amount of the movement of the drums relative to each other is extensive, I provide a longitudinally extending central well in the hull through which the line depends and above and over which at least one of the drums is longitudinally movable.

Trained over the driving drum for advancement by it and also trained over the hull idler drum is the line or digging line. This is of flexible material, such as a chain, having an upper run preferably in part hanging free and extending in the air between the two drums. The remainder of the line constitutes a lower run largely disposed in the water and depending from the two drums acting as catenary curve terminal points at about the same elevation. Diggers such as dragline buckets are connected to the digging line. The length of the line is such that the bottom of the catenary curve is in or near the desired digging zone. When the hull idler drum and the driving drum are moved relatively closer together, the bottom of the line having the catenary curve shape is lowered, and when the hull idler drum and the driving drum are moved relatively farther apart, the bottom of the line having the catenary curve shape is raised. This is one way of adjusting the digging depth. For a given length of line and hull location, if the hull drums are far enough apart and the digging depth is relatively shallow, it is possible to pay out sufficient line so that the line curvature is altered. For example, a substantially vertical run of line may extend from the hull driving drum to a subjacent point on the bottom. The line from that bottom point to the surface may describe a new catenary curve between the point at the bottom and the terminal point on the hull. The line configuration may be modified by extensive bottom contact.

For great depths, catenary curves originating at terminal points of substantially equal elevation require a long line and a long hull. For this and other reasons, I prefer to provide means affording an additional means in the form of another terminal point or line guiding unit for the catenary curvature of the line and to dispose this terminal point below the hull in the water near the bottom or excavating zone and usually in the same longitudinal, vertical plane defined by the freely hanging line. This additional or third terminal point is, in practice, established by a wheel, sheave, drum or the like engaging the line and which may be driven but usually is a free running idler. This I sometimes refer to as a fairlead. As a support for the additional terminal point or wet idler, I provide means supporting the idler for rotation about an axis normal to the mentioned vertical plane and in selected locations relative to the hull. This supporting means can take various different constructional forms, and in the present instance includes a frame or beam-like member referred to as a boom. While it can be stationary, the boom is mounted with respect to the hull to swing about a horizontal, transverse rotary axis usually substantially coincident with and preferably also travelling fore and aft with the axis of one of the hull drums, preferably the driving drum. The boom position is variable from a position that is approximately vertical to a position that is approximately horizontal. Swinging movement about the rotary axis is controlled by a tackle effective in tension to hold the boom is a selected, angular or polar position and effective laterally to hold the boom against excess transverse shifting. The boom is preferably U-shaped to straddle and swing below the hull. It is conveniently made hollow and buoyant. By varying ballast in the boom, the depth of the boom below the hull can be changed to selected levels without the use of the tackle. The boom can thus partake of retraction and extension relative to the hull.

The lower end of the boom extends horizontally between the boom legs and carries the additional, wet or boom idler drum in a position engaging the line. When the boom is approximately vertical, the line between the terminal points established by the hull driving drum and the boom idler drum is also approximately vertical. The catenary curve from the boom idler drum to an idler drum on the hull is about half the length of a corresponding catenary curve from two points at the elevation of the driving drum to the same depth as the boom idler drum.

Perhaps more important, the catenary curve of the line as shaped by the boom idler drum has an appreciable portion near the boom idler drum that is approximately horizontal for a substantial distance, so that there is a relatively long path of engagement of the diggers with the (approximately horizontal) bottom.

In cases wherein the water may be rough, and in any case to allow for side to side rocking of the hull while permitting the boom, the drums and other line engaging machinery to be relatively stable close to a vertical plane, I mount the driving drum and the hull idler drum for universal yielding movement relative to the hull in a transverse direction. This can be done in various ways and allowing various amount of freedom, but preferably I provide for motion about a common, fore and aft, central axis, so that reasonable rocking of the hull can occur without corresponding rocking of the boom or line. The amount of freedom is set by the design and is intended to take care of the allowable circumstances.

The diggers on the line are preferably in the form of dragline buckets secured to the line directly or, as is usually preferred, by flexible; i.e., non-rigid, connecting lines or chains of especially chosen lengths so that the buckets have some limited freedom of movement with respect to the digging line. There is no rigid connection between the digging structure near the water bottom and the hull, a factor of importance in reducing the chances of damage. The weight of the line and of the buckets attached thereto can be materially offset by floats attached to and moving with the line and serving as local supports.

In another version of the device, there is a double line; i.e., there are two separate loops of digging line of the same out line or contour and disposed in vertical, fore and aft planes parallel to each other. The two lines are similarly trained over the several drums. The double line or two lines are held in transverse relationship to each other by cross spacers extending between them. Both lines engage the same driving drum or coupled driving drums so that the lines are held in phase or "square" with each other. In the duplex version also, floats may be attached to the double line or two lines. When spacers are used, the spacers themselves may be buoyant to serve as floats.

Material removed from the bottom by the buckets is appropriately handled by equipment on the hull. This may include devices for discarding unwanted sizes, for separating values, for recovering values mixed in the excavated material, and the like.

While the invention illustrated is for underwater excavation, and certain features are particularly adapted for such use, it is apparent that whether the succession of buckets are suspended from supports on a hull floating on a body of water or on other structure spaced above the bed of material to be excavated, most of the advantages of the control system would be enjoyed. One example would be the removal of bulk material from the hold of a ship or barge, or elsewhere.

In view of the foregoing summary and to meet the numerous characteristics of different excavating operation, it is an object of the invention to provide improvements in underwater excavating to operate effectively without damage, economically and well, in instances where such operation, prior to my invention, has not been possible, feasible or economical.

It is another object of the invention to provide an underwater excavating machine without rigid contact with the bottom by hull appendages or digging mechanism.

It is another object of the invention to provide an underwater excavating machine supported on the water and in which reasonable movement of the supporting structure in the water does not disturb the excavating operation.

Another object of the invention is to provide an underwater excavating machine effective, even at considerable depths, economically to remove the bottom material underlying the water body and transport such material to the water surface.

Another object of the invention is to provide an underwater excavating machine in which the operating power is relatively low.

A further object of the invention is to provide an underwater excavating machine which can be easily put into transport condition and so moved about from place to place for advantageous excavation.

A still further object of the invention is to provide an underwater excavating machine in which the excavating units are carefully and accurately handled and guided.

A further object of the invention is to provide an underwater excavating machine in which the recovery mechanism is closely associated with the excavating machinery.

A further object of the invention is in general to provide an improved underwater excavating machine, particularly one for great depths.

An added object is the provision of an excavating machine for excavating and removing material from a bed thereof in which an endless succession of flexibly connected digging buckets is suspended in the form of an endless loop which is controlled for excavating at different depths and in digging engagement for different periods of time free from injury to the buckets.

Another object of the invention is the provision of an improved method of excavating material from a bed thereof.

Other objects together with the foregoing are attained in the embodiments of the invention described in the accompanying description and illustrated in the accompanying drawings, in which:

DESCRIPTION OF DRAWINGS

FIG. A is a diagrammatic view illustrating in full and broken lines a conventional endless bucket line and its manner of operation.

FIG. B is a diagrammatic view illustrating in full and broken lines one feature of the operation of the present invention, and manner of operation.

FIG. C is a diagrammatic view illustrating in full and broken lines different features of the present invention and method.

FIG. D is a diagrammatic view similar to FIG. C showing a feature of the present invention.

FIG. 1 is a side elevation, with some portions being shown diagrammatically and other portions being broken away, of an underwater excavating machine as it appears in its operating relationship.

Figure 2:
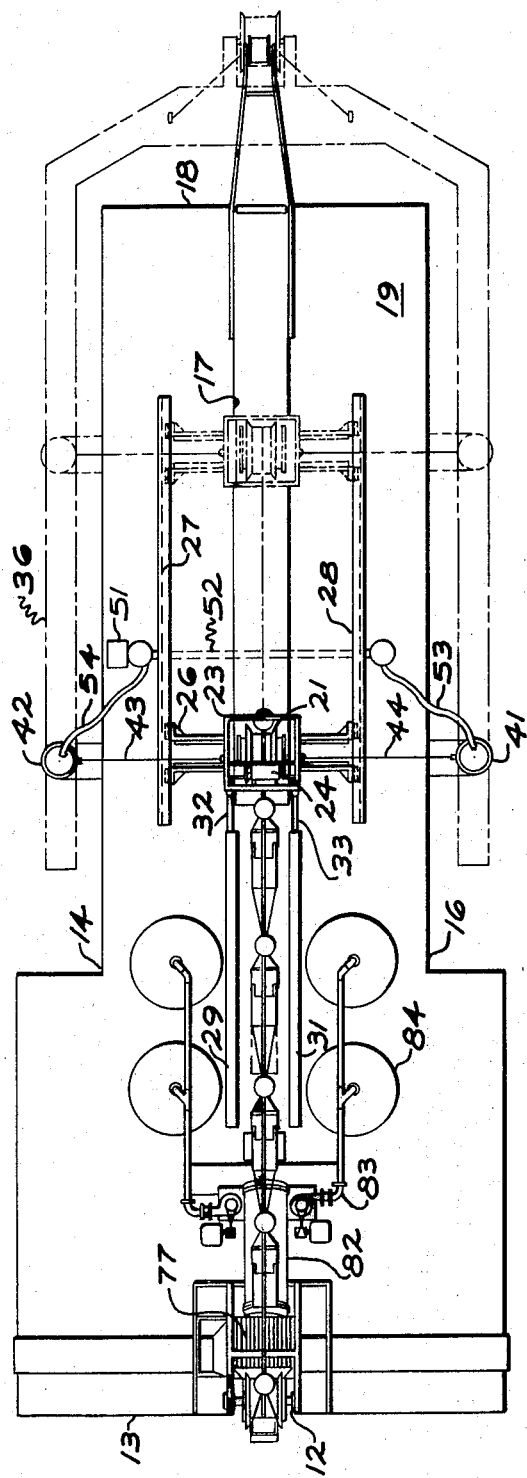

FIG. 2 is a plan of the structure shown in FIG. 1.

FIG. 3 is a bow elevation of the structure shown in FIG. 1.

FIG. 4 is a stern elevation of the structure shown in FIG. 1.

Figure 5:
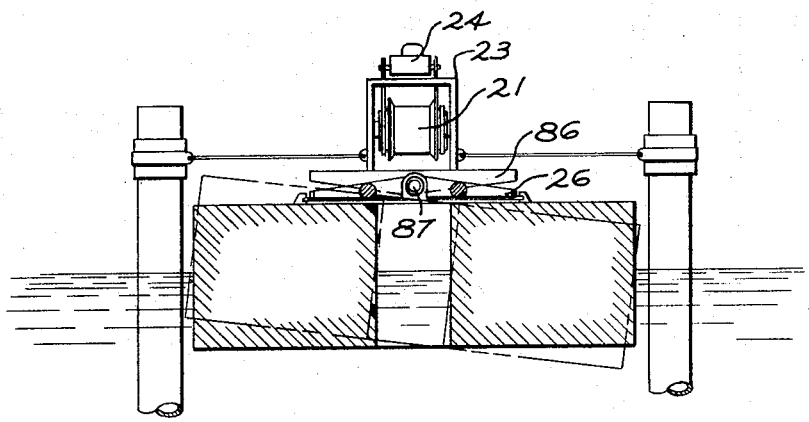

FIG. 5 is a cross-section of the upper portion of the structure shown in FIG. 1, the plane of section being indicated by the line 5—5 of FIG. 1, certain parts being omitted for clarity.

Figure 6:
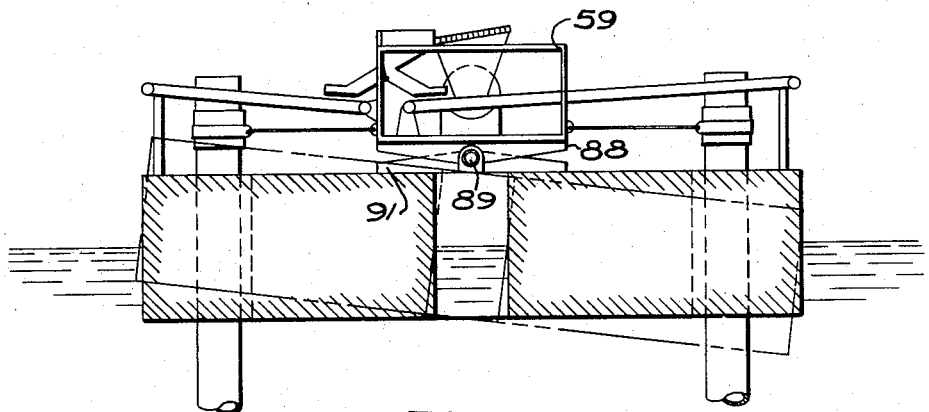

FIG. 6 is a cross-section like FIG. 5 but with the plane of section indicated by the line 6—6 of FIG. 1, there being similar omissions.

FIG. 7 is a side elevation of a modified form of structure comparable to that shown in FIG. 1, certain portions being broken away and other portions being illustrated diagrammatically.

Figure 8:
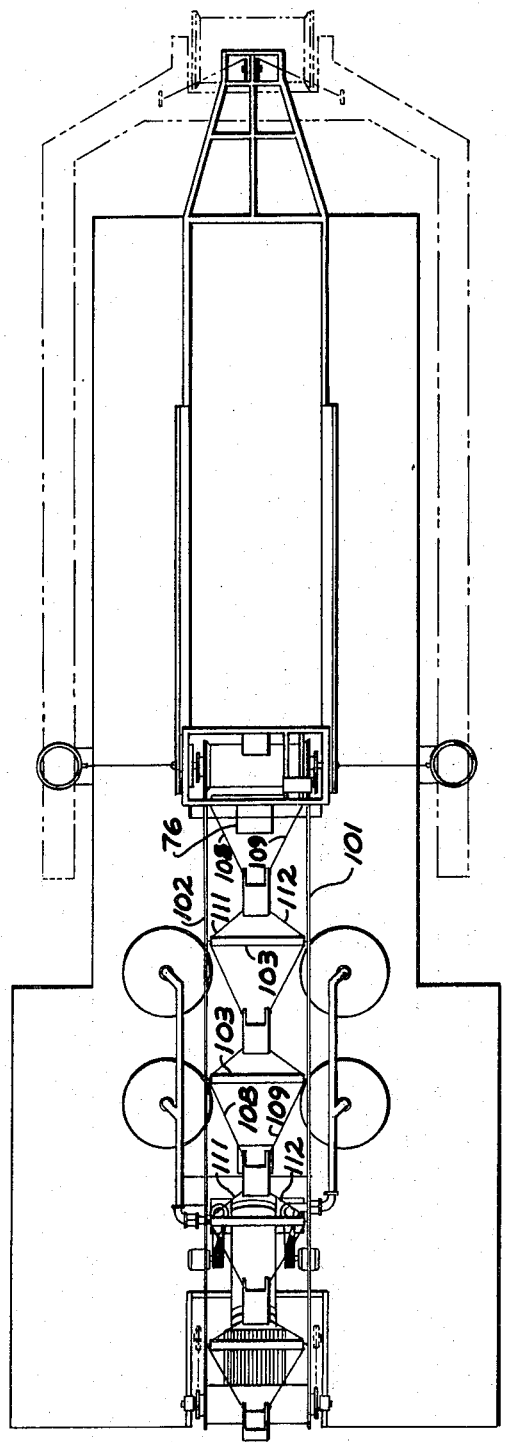

FIG. 8 is a plan of the structure shown in FIG. 7.

FIG. 9 is a bow elevation of the structure shown in FIG. 7.

FIG. 10 is a stern elevation of the structure shown in FIG. 7.

Figure 11:
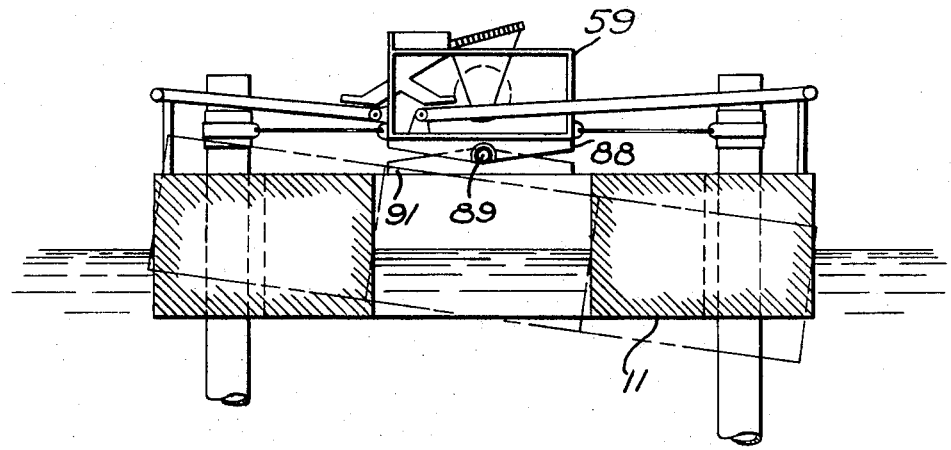

FIG. 11 is a cross-section of the upper portion of part of the structure shown in FIG. 7, the plane of section being indicated by the line 11—11 of FIG. 7, certain parts being omitted for clarity.

Figure 12:
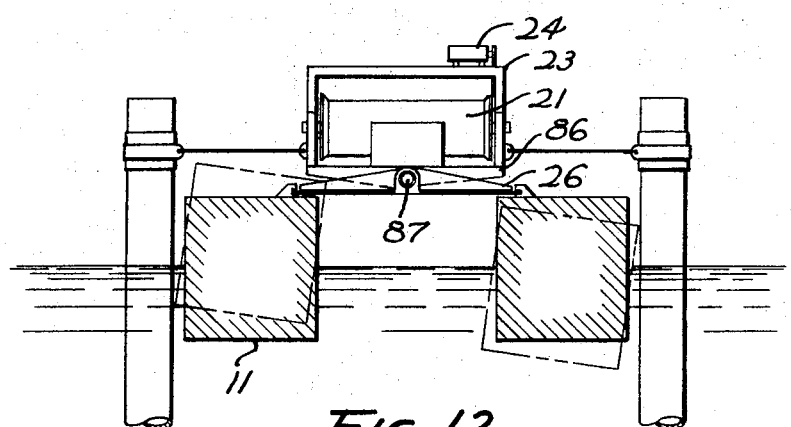

FIG. 12 is a cross-section somewhat like FIG. 11 but with the plane of section being indicated by the line 12—12 of FIG. 7, there being similar omissions.

FIG. 13 is an elevation of a buoyant spacer shown to an enlarged scale.

FIG. 14 is an end elevation of the structure shown in FIG. 13.

FIG. 15 is a side elevation to a greatly enlarged scale of a drag bucket.

FIG. 16 is an end elevation of the drag bucket shown in FIG. 15,

GENERAL DESCRIPTION

Introductory to the particular description, in FIG. A the bucket line 2 with which the buckets are flexibly connected, is an endless loop trained around a pair of supports 1, 21 fixedly spaced apart above the bed 7 of material to be excavated, the supports being shown as carried on a hull 11 that, in turn, overlies the bed. To be of practical use, the bucket line 2 has had sufficient slack to form a false catenary terminal at 4 on the bed 7, positioned approximately below one of the supports.

With this arrangement the control of the digging depth is not possible and the maximum digging depth is indicated by the broken line position of line 2, which is in the form of a true catenary.

FIG. B shows the support 21, which will be called the driving drum, as supported for movement toward the support 1, or idler drum, which is one of the features of the present invention. In this instance, although the line 2, depending from the supports 1, 21 were a true catenary making a point contact with the bottom, the digging depth indicated by the line in the broken line position would be substantial and the digging depth can be controlled.

In the arrangement of FIG. A and B, the ability to clean a bottom is not possible. By cleaning the bottom is meant the horizontal movement of the buckets along a horizontal level at the desired depth below the top of the bed.

Were a line of greater length provided than is shown in FIG. B, there would be no control of the resistance encountered by the buckets.

In FIG. C a substantially vertical boom 36 is movable along the hull with the driving drum and carries a boom idler drum 55 over which line 2 is trained at the lower end of the descending line from drum 21 with the lower portion 6 forming a flattened catenary adapted to clean up a bottom at any digging level and this digging depth is controlled by the position of drum 21 combined with the position of boom 36.

Boom 36 may be pivoted through the different broken line positions 8 for carrying the depending portion of the loop or bucket line 2 to different heights.

While the diagrams show some of the principal line positions possible, it should be understood that excavating or drag line buckets 64 as shown in FIG. D, are nonrigidly or flexibly connected to the line, or lines, so that while they generally follow the line contour, they are sufficiently free, within limits, to dig at somewhat deeper depths and to move with partial independence, so that the bottom conditions are not adversely or excessively reflected to the line or to the boom or hull.

PARTICULAR DESCRIPTION

Underwater excavation pursuant to my invention can be accomplished on virtually any body of water and is herein disclosed as it is performed by machines in two principal commercial forms. In both forms the machine floats on a water body 6 disposed above a bottom 7 on which material 8 to be excavated is found. As an example only, the distance between the level of the water 6 and the bottom 7 is shown as approximately 150 feet, with 50 feet of material available for digging. However, the machine is capable of taking materials from an elevation just below the bottom of the hull down to the bottom 7, a distance that can be of the order of 600 feet.

Adapted to float in water 6 is a boat or hull 11 of a buoyant nature and of generally standard construction. The hull is positioned or anchored at selected locations by appropriate lines (not shown) in the customary way. The hull has, as particularly shown in FIG. 2, a reentrant well 12 in its bow 13 and has cut away sides 14 and 16 in the after portion. Likewise there is a reentrant well 17 extending into the hull from the stern 18.

Adapted to be supported on the deck 19 of the hull is a catenary terminal in the form of a driving drum 21 of appropriate construction designed to rotate on an axle 22 about a transverse axis and supported on a suitable framework 23. A motor or engine driving device 24 is connected to rotate the driving drum normally in a clockwise direction, as seen in FIG. 1. Since it is desired to move the framework 23 fore and aft into various locations along the center line of the hull deck 19 and over the well 17, the framework is supported on anti-friction devices such as sliding feet 26 operable in a longitudinal, central direction along guides 27 and 28 arranged symmetrically and extending in a fore and aft direction on the deck.

In order to move and hold the framework 23, suitable means are provided. As an example, a pair of hydraulic cylinders 29 and 31 are mounted on the deck with their plungers 32 and 33 connected to the framework to move it between a forward position, as shown by the solid lines in FIG. 2, and an after position, as shown by the dotted lines in FIG. 2, and to hold the framework in those positions or in any intermediate position. The hydraulic mechanism, by the usual piping and valving, secures the framework 23 in any selected fore and aft position despite substantial loads imposed upon it.

Designed to cooperate with the hull is a duplex boom generally designated 36. As particularly shown in FIGS. 3 and 4, the boom includes a pair of legs 37 and 38 at their bottom joined by a cross beam 39. The boom is preferably of hollow construction and by itself is buoyant in the water. The boom is designed to rise and fall; i.e., retract and extend, and to swing. The legs move alongside the cut away sides 14 and 16 of the hull. The boom is held or restrained in any of its particular fore and aft or angular positions by appropriate collars 41 and 42 slidable on the upper portions of the legs 37 and 38. The collars are connected by cables 43 and 44 to the framework 23. Thus, as the framework 23 travels forward and aft, the collars 41 and 42 are similarly moved and correspondingly move the boom fore and aft spanning and alongside the hull. At the same time, the boom is also angularly located or rotated and restrained by a pair of laterally spread, tension stern lines 46. At one end these are secured to laterally spaced points at the lower portion of the boom 36. At the other, upper end, the lines 46 travel around a pair of close sheaves 47 on a superstructure 50 and then connect to an appropriate winch mechanism, not shown.

The result of this mooring of the boom is that the boom can be swung between a substantially vertically upright, working position, as shown by the full lines in FIG. 1, and an approximately horizontal, cruising position, as shown by the dotted lines in that figure. The boom swinging axis is exactly or approximately coincident with the transverse cables 43 and 44 and the axle 22. The boom and its swing axis can be bodily moved fore and aft along the hull by correspondingly moving the framework 23. The boom can also rise and fall in a vertical direction relative to the hull. In fact, by combining the various swinging, horizontal and vertical boom motions the operator can move the boom into and can hold it in a wide variety of positions with respect to a vertical plane extending along the bow-stern center line of the hull. This provides various digging depths and positions as well as a shallow draft position for transportation.

Since the boom is hollow and is buoyant, its depth is altered and controlled by pumping water into it or extracting water from it. For that reason, as particularly shown in FIG. 2, there is provided on the deck 19 a pump 51 appropriately driven and controlled. The pump is effective through a cross pipe 52 and flexible hoses 53 and 54 to put water into the hollow legs 37 and 38 and into the bottom hollow beam 39 of the boom. When the boom weight is thus made greater, the boom tends to lower, the legs sliding through the collars and pulling down the stern tension lines 46 when they are free. When the pump is reversed, then water is taken out of the interior of the hollow boom and is wasted overboard until the boom is sufficiently light to float up to the desired elevation. The stern lines are correspondingly taken in. By appropriate manipulation of the driving drum 21, of the hydraulic cylinders 29 and 31, and of the pump 51, as well as the stern lines 46, the boom can be maneuvered into a number of locations and positions and is well maintained in chosen positions by tension in the stern lines.

Mounted to rotate freely at the lower end of the boom 36 is a flanged boom idler drum 55 or wet idler drum designed to turn on a transverse axle 56 about a transverse axis. In a comparable fashion, there is provided a dry or hull idler drum 57 mounted to rotate on a transverse axle 58 about a transverse axis. The axle 58 is disposed on a superstructure 59 at the bow of the hull 11. The construction of the hull idler drum 57 is substantially the same as that of the boom idler drum 55.

Trained around and forming a loop about the driving drum 21, the boom or wet idler drum 55 and the hull or dry idler drum 57 is a line 61 of a flexible, strong material such as cable or chain. This is a single line which has central engagement with the driving and idler drums so that the line is advanced by the driving drum rotation. It is sometimes advisable to have an auxiliary drum 62 similar to the idler drum 57 at the bow of the hull simply to maintain an appropriate line contour.

The configuration of the line 61 between the driving drum 21 and the wet idler drum 55 is usually an approximately vertical straight line, although the line inclines with swinging of the boom 36. It is sometimes the practice, primarily to stabilize against surge, to position the boom 36 and the line 61 somewhat off vertical.

The carriage for the framework 23 and the boom travels fore and aft. The upright or substantially upright or vertical position of the boom and of the line 61 thus can readily be maintained. The line is kept in tension by raising and lowering the boom or, alternatively, by moving the framework 23 fore and aft or by moving the carriage of the framework 23 as the boom depth is changed or by swinging the boom. Between the idler drum 55 and idler drum 62, if used, or the idler drum 57, the configuration of the line 61, where not otherwise supported, is substantially that of a catenary curve.

Due to the elevation or level of the line supports, there is a nearly flat or horizontal portion of the line leaving the idler drum 55. If the line is permitted to run along the bottom, it approximates the bottom contour, while the subsequent line portion, away from the bottom, describes a new catenary curve. Between the idler drum 57 and the driving drum 21 the shape of the line is a relatively flat catenary curve except for the line portion that is supported. I prefer always to leave some unsupported line for "spring" effect to cushion shock loads or overloads.

Particularly pursuant to the invention, the line 61 at appropriate intervals thereon has securing means 63. These are generally enlargements of the line 61 capable of passing over the various drums without difficulty. Connected to the line 61 and particularly to the securing means 63 thereon are diggers such as drag buckets 64. Each of the buckets is configured substantially as shown in FIGS. 15 and 16 and includes a transversely and longitudinally tapered, rectangular body having a generally semi-circular end 66 approximately centered on connecting lugs 67 and has a digging lip 68 thereon with bottom and side teeth. Ears 69 at the forward end of the bucket have alternately usable apertures 71. The closed top of the bucket has a curved surface 72 designed to fit the similar, circular cylindrical curved surfaces of the drums 21 and 57.

Each of the buckets 64 is provided with bridle chains engaging one or the other lateral pair of apertures in the lugs 67 and other bridle chains engaging a selected pair of the apertures 71. A forwardly extending head line 73 and a stabilizing, rearwardly extending tail line 74 unite with the respective, adjacent securing means 63.

Some or most of the vertical load is taken from the line 61 by floats 75 fastened to the securing means 63. These floats are buoyant members connected to the line 61 and exert a generally upward force particularly effective in assisting in overcoming the weight of the line 61 and its appurtenances.

The position of the buckets during their circuit is typically as shown in FIG. 1. As a bucket 64 approaches the driving drum 21, for example, it is partially oriented and lifted by a ramp 76 so that the bucket readily rounds the drum and then is located by its own lines 73 and 74 on the downgoing portion of the line 61. The bucket continues around the boom idler drum 55 and advances in an excavating attitude. As the bucket encounters the bottom, the bucket weight is largely removed from the line 61, so that irregularities in the bottom can be followed and excavated by the bucket without disturbing the line 61 to an appreciable or disadvantageous extent. That is, the buckets as they are advanced by the line 61 are nevertheless relatively free to move limited vertical and lateral distances with respect to the line 61. Forces due to bottom irregularities thus are not detrimentally transmitted to the idler drum 55 nor to the boom nor to the hull. Also, motion of the line 61 due to hull heaving is not directly transmitted to and does not disturb the bucket path of excavation.

As the bucket travels along substantially horizontally, to the left in FIG. 1, its lip 68 engages with the material 8 and strips off a portion of such material. Whatever values are included with the removed material are likewise loaded into the bucket. The load is brought upwardly out of the water around the auxiliary drum 62 (if used), and around the idler drum 57. At this juncture the rounding bucket is dumped onto a grizzly 77. The dumping impact of the bucket is controlled by the rate of bucket inversion and changing slack in the bucket chains. This is affected by the size of the drum which affords a longer or shorter drop of the bucket, due to chain slack, as it passes over the drum to vary the unloading impact of the bucket above the grizzly. The drum size is varied by lagging or padding around the drum to change its radius and so change the allowable chain slack and correspondingly the dumping impact.

As the bucket is dumped, the finer material passes through the grizzly. The coarser material, particularly as shown in FIG. 3, is diverted onto a divider 78 leading to a conveyor 79 from which the coarse material can go overboard or into a tail sluice or barge on one beam and to an alternately usable conveyor 81 leading overboard or into a sluice box or barge on the other beam. Large material having or carrying no values is thus immediately discarded in either chosen direction. Material passing through the grizzly 77 travels into a trommel 82 of the usual sort with appropriate washing facilities, if needed. Waste material is transferred lengthwise through the trommel for discard, whereas the remaining material passes through the trommel openings into a pump and pipe circuit 83 leading to sluice boxes, rotary jigs 84 or similar value recovering mechanism. The residue may flow through sluice boxes to a waste pump or tailing sluices. The drag buckets after they are discharged onto the grizzly 77 continue to advance in the upper run of the line 61 and again encounter the ramp 76 to travel again in the same loop.

During operation, the water surface 6 may be rough. For that reason, particular means are provided for mounting some of the equipment so that rocking of the hull, within limits, is not harmful. As particularly shown in FIG. 5, the carriage frame 23 for the driving drum 21 is mounted on a cradle 86 having a horizontal, fore and aft or longitudinal pivot axle 87 connecting the framework 23 to the sliding foot frame 26. With this mechanism the hull can rock between the solid line position shown in FIG. 5 and the broken position shown therein without in any wise disturbing the set position of the frame 23. In a somewhat similar fashion, as shown in FIG. 6, the superstructure 59 with its attendant mechanisms is similarly provided with a base 88 journalled on a fore and aft or longitudinal, horizontal axle 89 in turn mounted on a base frame 91 connected to the hull, so that the hull can rock or tilt as shown by the full line and broken line positions without disturbing the superstructure and mechanisms attached to it.

In another embodiment of the invention, as particularly shown in FIG. 7 and thereafter, the general arrangement is as previously described except that the various driving and idler drums carry, as shown in FIGS. 8 to 10, a pair of lines 101 and 102. Since they engage the same driving drum, the two lines are synchronized. These are parallel to each other so far as their looping characteristics are concerned and are evenly spaced apart by a number of fixing means 103 or spacers all of the same length. These spacers are formed approximately as shown in FIG. 13 so as to be non-fouling and include end fasteners 104 and 106 engaged with the lines 101 and 102. The spacers have hollow intermediate portions 107 so that the spacers are highly buoyant. The spacers are mounted between the lines 101 and 102 to pass readily around the various driving and idler drums.

In this instance each of the dragline buckets 64 instead of having a forward bridle to a head line and instead of having a rearward bridle to a stabilizing line rather has four separate lines, as shown in FIG. 8. There are two tension or drag bow lines 108 and 109 as well as two stabilizing or carrier stern lines 111 and 112. Each of these lines extends from one of the fastenings 67 or 71 to the respective end of the nearest stabilizer spacers 103. The length of these various lines is such that the dragline bucket 64, although freely and easily suspended, can rotate about its own longitudinal axis and about its own transverse axis only a limited amount and cannot be tripped, tangled or inverted. It is thus always maintained with its cutting edge 68 in position to move against the material to be excavated.

The operation of this form of the structure is substantially the same as previously described since the various devices, except primarily for the double lines, are unchanged. An advantage of having the buoyant spacers 103 is that they support the weight of the line and the buckets to the extent desired, thus relieving strain and weight on the line and on the driving and supporting drums. They permit extension of the line and changes in the line loop shape without material change in the drum loadings. As the line or lines, including the buckets, the floats and accessories, is or are in balance, the principal load imposed on the driving means is only the inevitable friction together with the digging and hoisting load of the excavated material. The amount of float buoyancy can, of course, be changed, so that as much as desired of the line load can be offset.

In both embodiments of the invention there is provided an underwater excavating machine effective under almost all conditions to excavate and remove material from substantial depths without injury to the machinery and with economical and satisfactory operation. The arrangement achieves multidirectional yielding contact with the bottom material so that within the intended range of use (holding and movement) the forces developed by the mass of the floating system are not deleteriously imposed on any part. Conversely, the forces developed by the buckets during excavation are not deleteriously impressed upon the remainder of the structure. This assists the arrangement in excavating well under the design conditions and at great depths not otherwise possible.

From the foregoing it is seen that the endless succession of flexibly connected excavating buckets 64 forms an endless loop that is supported in a vertical plane from a pair of rotatable supporting means which are within the loop at its upper end. The length of the loop suspended below the drums tends to hang freely along a catenary curve, as seen in FIGS. A to D inclusive. This succession of buckets is circulated in one direction providing a descending portion extending downwardly from one of said supporting means, a bottom portion, the buckets of which are in digging and filling engagement with the bed of material to be excavated, and an ascending portion that extends from the lower portion to the other of said supporting means. Guide means, within the loop at the lower end of the descending portion guides the descending portion along a predetermined path from said one of said supporting means with the ascending portion freely suspended from the other supporting means, it being understood that the drum 62, if and when used, is merely a supplemental guide which does not support the loop.

Means above the lower portion supports the guide means for movement to different positions within said plane for varying the path of travel of said descending portion, and actuating means is provided for effecting movement of the guide means to said different positions, and one of the supporting means is movable toward the other for varying the downward length of the suspended portion of the loop and the digging depth of the buckets along the lower portion, as seen in FIGS. B through D.

The means for flexibly connecting of the buckets of the succession permit free movement of the buckets of adjacent pairs vertically along the lower portion of the loop independently of the guide means when in digging engagement with the material to be excavated, thus preventing strain or injury to the buckets should the guide means unexpectedly move downwardly or should the buckets move upwardly on meeting obstacles in the material.

Where the succession of buckets and its supports and the guide means are on a floating hull, they will remain substantially in a vertical plane upon surging or rolling of the hull under the influence of natural forces, such as waves, wind, etc. or other forces such as unbalancing of the hull.

In operation, the foregoing structure enables performance of the steps, in a method, of suspending in a substantially vertical plane from a pair of generally horizontally spaced points of suspension, an endless succession of excavating buckets in the form of a loop with the points of suspension within the upper portion of the loop and with the remainder of the loop below said points tending to hang freely along a catenary curve.

When the succession is circulated in one direction a descending portion of the loop extends from one of said points to the lower portion of the loop, and an ascending portion extends from said lower portion to the other point of suspension, with the buckets at the lower portion in digging engagement with the material of the bed.

The step of increasing the digging depth of the buckets along the lower portion may be affected by simultaneously increasing the length of the loop suspended below said suspension points and decreasing the length of the loop above and extending between the points of suspension. One way this step, in turn, may be accomplished is by moving one of said points of suspension different distances toward the other, as seen in FIGS. B through D.

The apparatus as described also enables the step of yieldably holding the descending portion in a path extending vertically downwardly at a holding point within the loop spaced below one of the points of suspension, and supporting a length of the lower portion adjacent the holding point extending generally horizontally in a clean-up position during lowering of said lower portion to different distances.

The apparatus further enables the method step of elevating the remainder of the loop, which is the portion suspended from said suspension points, by moving the holding point inwardly and away from the ascending portion as seen in FIG. C.

The method practiced in underwater excavating is one in which the buckets and appurtenances in the water are buoyed both decreasing the normal gravitational strain on the succession and the force required for circulation of the succession.

I claim:

1. The method of excavating material from a bed thereof that includes the steps of:
   a. suspending in a substantially vertical plane from a pair of generally horizontally spaced points of suspension, an endless succession of excavating buckets in the form of a loop with said points within the upper portion of said loop and with the remainder below said points tending to hang freely along a catenary curve;
   b. moving said succession to circulate the same in one direction providing a descending portion of said loop from one of said points to a lower portion at the bottom of said loop and an ascending portion from said lower portion to the other point of suspension with the buckets at said lower portion in digging engagement with the material of said bed during said movement;
   c. progressively lowering said lower portion relative to said points of suspension to lower the digging depth of the buckets of said lower portion different distances downwardly by simultaneously increasing the length of the loop suspended below said points and decreasing the length of the loop above said remainder and extending between said points, during said circulation of the buckets of said succession.

2. In the method as defined in claim 1:

d. the step of simultaneously increasing and decreasing said lengths being effected by moving one of said points of suspension different distances from the other.

3. The method as defined in claim 1 that includes the step of:

d. yieldably holding said descending portion of said succession in a path extending generally vertically downwardly from said one of said suspension points to said lower portion at a holding point within said loop spaced below said one of said points and supporting a length of said lower portion adjacent said holding point in a generally horizontally extending clean-up position during said lowering of said lower position to said different distances downwardly.

4. The method as defined in claim 3 that includes the step of:

e. elevating said remainder of said loop to different distances in said plane while maintaining said holding point in engagement with said loop by moving said holding point in a direction upwardly and away from said ascending portion.

5. The method as defined in claim 3:

e. yieldably supporting each of the buckets of said succession for movement independently of the others relative to the length of said lower portion under the influence of variations in the resistance of said bed during digging.

6. The method of underwater excavation of material of a bed thereof below a body of water that includes the steps of:

a. suspending in a substantially vertical plane from a pair of generally horizontally spaced points of suspension floatingly supported above said body an endless succession of excavating buckets in the form of a loop extending into said body with said points within the upper portion of said loop and with the remainder below said points tending to hang freely along a catenary curve;

b. moving said succession to circulate the same in one direction providing a descending portion of said loop from one of said points to a lower portion at the bottom of said loop and an ascending portion from said lower portion to the other point of suspension with the buckets at said lower portion in digging engagement with the material of said bed during said movement;

c. progressively lowering sad lower portion relative to said points of suspension to lower the digging depth of the buckets of said lower portion different distances downwardly by simultaneously increasing the length of the loop suspended from and below said points and decreasing the length of the loop extending above said remainder and between said points during said circulation of the buckets of said succession.

7. The method as defined in claim 6 that includes the step of:

d. holding said descending portion in a path extending generally vertically downwardly from said one of said points of suspension to said lower portion at a holding point within said loop at said lower portion spaced below said one of said points of suspension, and supporting a length of said lower portion adjacent said holding point in a generally horizontally extending clean-up position extending from the lower end of said descending portion during said lowering of said lower portion at each of said distances downwardly.

8. The method as defined in claim 7 that includes the step of:

e. pendulously supporting said points of suspension and said loop and holding point in said plane from a hull floating on body of water whereby said loop, points of suspension, and holding point, will remain substantially stable in said plane relative to movement of said hull from wave force and other natural forces.

9. The method as defined in claim 7 that includes the step of:

e. moving said holding point downwardly to said different distances simultaneously with downward lowering of said lower portion by application of progressively increasing downward force to said holding point and yieldably holding said holding point at each of said different distances.

10. The method as defined in claim 6 that includes the step of:

d. buoying the succession of buckets submerged within said body against the force of gravity thereby decreasing the normal gravitational strain on said succession and the normal force required for circulation thereof.

11. The method as defined in claim 6 that includes the step of:

d. yieldably holding said descending portion in a path extending generally vertically downwardly from one of said points of suspension to said lower portion at a holding point within said loop spaced substantially vertically below said one of said points of suspension and supporting a length of said lower portion in a generally horizontally extending clean-up position extending from the lower end of said descending portion at each of said distance downwardly.

12. An excavating machine comprising:

a. a hull adapted to be floatingly supported on a body of water in a position spaced above a bed of material to be excavated;

b. an endless row of spaced excavating buckets, each having spaced side walls, a leading digging end, and a trailing end, connected for movement longitudinally of said row with their digging ends facing one direction;

c. line-means extending longitudinally of said row connecting said buckets for simultaneous movement in said one direction and driving means on said hull in driving engagement with said line means for effecting said movement;

d. a pair of horizontally spaced suspending means on said hull suspending said line connecting means and said row of buckets in a loop of generally catenary shape depending below said support in a vertical plane providing a horizontally extending upper portion at said hull and a descending and ascending portion respectively extending downwardly from the ends of said horizontally extending portion to a lower digging portion for digging engagement at said lower portion with the material to be excavated when the buckets of said row are moved in said one direction;

e. supporting means supporting one of said suspending means on said hull for horizontal movement toward and away from the other suspending means for varying the digging depth of the buckets at said lower portion during movement of said line-means and buckets in said one direction;

f. means connected with said supporting means for moving the latter and the suspending means supported thereon toward and away from said other of said suspending means;

g. guide means carried by said hull supported within said loop in engagement with said line-means at said lower portion and vertically below said one of said suspending means for movement vertically to different positions relative to said hull for changing the catenary shape of said row and for varying the excavating depth of said lower portion with the buckets of said ascending portion freely suspended from said suspending means at each of the different digging depths; and h. guide moving means operatively connected with said guide means for moving said guide means to said different positions.

13. An excavating machine as defined in claim 12 including:

i. said guide means and said one of said suspending means being connected for upward movement of said guide means simultaneously with movement of said one of said suspending means away from said other of said suspending means, and for downward movement of said guide means simultaneously with movement of said one of said suspending means toward the other, whereby said guide means will be substantially vertically below said one of said suspending means during movement of said one of said suspending means toward and away from the other.

14. An excavating machine as defined in claim 12:

i. mounting means for pendulously supporting said suspending means, supporting means, guide means, bucket line and buckets substantially in said vertical plane during movement of said hull under the influence of waves and other natural forces.

15. In an excavating machine as defined in claim 12:

i. said line means comprising a pair of horizontally spaced, parallel, endless, flexible bucket lines in side-by-side relation extending across and in engagement with said suspending means and said guide means, and parallel, adjacent pairs of rigid spacers extending horizontally between said pair of bucket lines and secured at their ends to the latter holding said bucket lines in spaced relation to each other and said spacers being uniformly spaced apart in a direction longitudinally of said bucket lines, with one excavating bucket for each adjacent pair of spacers;

j. a first pair of flexible bridle lines of equal length connecting opposite sides of each bucket adjacent its leading end with the bucket lines of said pair thereof adjacent opposite ends of one of said spacers, and a second pair of flexible bridle lines of equal length connecting the opposite sides of each bucket adjacent its trailing end with the bucket lines adjacent opposite ends of the spacer adjacent said one spacer but rearwardly thereof relative to the direction of movement of said bucket lines, said first and second pair of bridle lines extending divergently away from said leading and trailing ends respectively for holding said buckets against overturning and between said lines.

16. In an excavating machine as defined in claim 15:

k. said first pair of bridle lines being longer than said second pair of bridle lines and the lengths of the lines of said first pair being less than the distance between adjacent spacers, whereby said buckets will be suspended vertically from said ascending portion with their digging ends uppermost during their upward movement with said ascending portion.

17. In an excavating machine as defined in claim 15:

l. said spacers being buoyant to reduce the load of the filled buckets on said bucket lines along said ascending portion of said line-means.

18. In an excavating machine as defined in claim 12:

i. said guide means including a substantially vertically disposed boom adjacent said one of said suspending means having a fairlead at its lower end in said engagement with said lower portion of said line means within said loop; and j. said guide moving means being connected with said boom for moving said boom vertically to carry said fairlead to said different positions.

19. In an excavating machine as defined in claim 18:

k. a boom support for supporting said boom for swinging its lower end including said fairlead upwardly and rearwardly in a direction away from said ascending portion of said line-means for elevating said line-means and buckets above said bed for moving said hull and buckets from one digging site to another. for 20. In an excavating machine as defined in claim 12:

i. means for yieldably supporting said guide means at each of said different positions for upward movement under predetermined upward force thereagainst due to rise and fall of said hull under the influence of waves, and swells and other natural forces.

21. An underwater excavator comprising the combination of:

a. a hull adapted to be floatingly supported on a body of water in a position spaced above material to be excavated;

b. an endless succession of buckets and an endless, flexible line-means flexibly connecting said buckets in the form of a loop;

c. a pair of horizontally spaced, rotatable, line suspending means on said hull within said loop supporting said loop suspended therefrom in a vertical plane with the part below said suspending means suspended therefrom in a catenary curve, providing a descending portion extending from one of said suspending means to a lower digging portion and an ascending portion extending from said lower portion to the other of said suspending means;

d. means for moving said line-means and said endless succession in one direction for downward movement of said descending portion and upward movement of said ascending portion and from said other suspending means to said one suspending means;

e. a single boom extending from said hull to said lower digging portion and guide means on the lower end of said boom supported within said loop at said lower portion vertically below said one suspending means for positioning buckets of the loop at said lower portion substantially directly below said one suspending means in digging relation to said material, and for holding said descending portion freely hanging from said one suspending means to said guide means with said ascending portion hanging freely in a catenary curve from said other suspending means toward said guide means;

f. means supporting one of said suspending means for movement thereof horizontally on said hull toward and away from said other suspending means and means for moving said boom for upward movement of said guide means upon movement of said one suspending means away from said other suspending means, and for downward movement upon movement of said one suspending means toward said other suspending means for varying the digging depth of said lower portion at said guide means, all while moving said endless succession in said one direction.

22. In an excavator as defined in claim 21:

g. means flexibly connecting the buckets of said succession with said line means for movement of said buckets along a path spaced below said guide means and for free movement toward said guide means during movement past the latter to premit said buckets to move over irregularities in the surface of said material without engaging said guide means.

* * * * *